US007586677B2

(12) United States Patent
Bertschi et al.

(10) Patent No.: US 7,586,677 B2
(45) Date of Patent: Sep. 8, 2009

(54) STEREOMICROSCOPE SYSTEM HAVING AN INCIDENT ILLUMINATION DEVICE

(75) Inventors: Peter Bertschi, Altstätten (CH); Roman Gerster, Triesen (LI); Peter Soppelsa, Rebstein (CH)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 0 days.

(21) Appl. No.: 11/460,148

(22) Filed: Jul. 26, 2006

(65) Prior Publication Data

US 2007/0030564 A1  Feb. 8, 2007

(30) Foreign Application Priority Data

Aug. 2, 2005  (DE) .................. 10 2005 036 230

(51) Int. Cl.
*G02B 21/06* (2006.01)
*G02B 21/00* (2006.01)
(52) U.S. Cl. .................. 359/385; 359/368; 359/390
(58) Field of Classification Search ......... 359/368–390; 362/245–294
See application file for complete search history.

(56) References Cited

U.S. PATENT DOCUMENTS

| 2,208,882 | A | * | 7/1940 | Graff et al. ........... 359/382 |
| 3,798,435 | A | * | 3/1974 | Schindl ................ 362/232 |
| 4,852,985 | A | * | 8/1989 | Fujihara et al. ........ 359/387 |
| 5,038,258 | A | | 8/1991 | Koch et al. ............ 362/237 |
| 5,690,417 | A | * | 11/1997 | Polidor et al. ......... 362/244 |
| 5,897,195 | A | * | 4/1999 | Choate ................. 362/33 |
| 6,181,471 | B1 | * | 1/2001 | Miyoshi ............... 359/388 |
| 6,369,939 | B1 | * | 4/2002 | Weiss et al. ........... 359/387 |
| 6,479,807 | B1 | * | 11/2002 | Toshimitsu .......... 250/201.3 |
| 6,995,904 | B2 | * | 2/2006 | Tonooka .............. 359/390 |
| 2004/0263960 | A1 | | 12/2004 | Obuchi ................ 359/385 |
| 2005/0168627 | A1 | * | 8/2005 | Yi et al. ............... 348/373 |

FOREIGN PATENT DOCUMENTS

DE  298 09 759  8/1998
DE  100 30 772  10/2001

* cited by examiner

*Primary Examiner*—Thong Nguyen
(74) *Attorney, Agent, or Firm*—Hodgson Russ LLP

(57) ABSTRACT

A stereomicroscope system (1) having an incident illumination device is disclosed. The stereomicroscope system (1) comprises a base (13) on which a focusing column (11) is secured. Mounted shiftably on the focusing column (11) is a focusing arm (5) which has an opening that serves to receive a stereomicroscope (3). The stereomicroscope (3) defines a device axis (20) that is perpendicular to the base (13). Multiple light-emitting diodes (30) are arranged in the focusing arm (5) around the receiving opening (5c). Multiple light-emitting diodes (31) are likewise arranged along the focusing arm (5) between the focusing column (11) and the receiving opening (5c).

14 Claims, 4 Drawing Sheets

STEREOMICROSCOPE SYSTEM HAVING AN INCIDENT ILLUMINATION DEVICE

CROSS REFERENCE TO RELATED APPLICATIONS

This application claims priority of German patent application no. 10 2005 036 230.3 filed Aug. 2, 2005, which is incorporated by reference herein.

FIELD OF THE INVENTION

The invention relates to a stereomicroscope system having an incident illumination device. The invention relates in particular to a stereomicroscope system having an incident illumination device, which system comprises a base on which a focusing column is secured. Mounted shiftably on the focusing column is a focusing arm which carries a stereomicroscope that defines a device axis that is perpendicular to the base. The stereomicroscope can be embodied according to Greenough or can be of the telescope type having a main objective, and can be detachably joined to the focusing arm or integrated thereinto.

BACKGROUND OF THE INVENTION

U.S. Patent Application US 2004/0263960 discloses a stereomicroscope that has multiple light-emitting diodes provided on a planar carrier for illumination. A further illumination device made up of light-emitting diodes is additionally provided, for oblique illumination, in the focusing arm in the vicinity of the objective opening. A third illumination device having light-emitting diodes is embodied in annular fashion and is mountable around the objective opening of the stereomicroscope. A substantial disadvantage of the illumination device that is arranged around the objective opening of the stereomicroscope is that it represents a separate element and thus can easily be lost or stolen.

German Unexamined Application DE 39 06 555 A1 discloses an incident-light specimen illumination device. The incident-light specimen illumination device encompasses multiple individual switchable light sources (self-luminous elements, glass fibers, or apertures illuminated from behind). The light sources are advantageously arranged in multiple concentric circles in different planes, from which light is emitted with different radiation axes. Illumination is thus possible at different selectable illumination angles with no mechanical displacement of light sources or imaging elements. The individual light sources are secured in a semispherical carrier. The carrier is arranged around the objective of the microscope or of the observation device.

German Utility Model DE 298 09 759 U1 discloses an apparatus for medical treatment using a light source. The light sources for illumination of a surgical field are embodied as light-emitting diodes, and are arranged so that the radiation emitted by them strikes the surgical field at an angle of between 5° and 80° with respect to an optical axis. This apparatus says nothing, however, about the setting of different illumination conditions, and does not mention that the light-emitting diodes can be used in the illumination system for a microscope or a stereomicroscope.

German Unexamined Application DE 100 30 772 A1 discloses an arrangement and a method for illumination, in particular for incident illumination, in microscopes having an annular carrier, oriented around the optical axis, for the reception of illuminating means. The light-emitting diodes are mounted on the annular carrier in at least two concentric circles. The annular carrier is arranged symmetrically about the optical axis of a microscope objective. The light-emitting diodes possess a relatively small emission angle, and are directed or tilted toward the optical axis of the microscope. White-light LEDs are used as diodes. The LEDs can likewise be connected together in groups, and are operated via a controllable constant-current source. A disadvantage here as well is that the light-emitting diodes are mounted on a separate carrier that once again is easy to misappropriate or easy to lose.

SUMMARY OF THE INVENTION

The object underlying the invention is that of creating a stereomicroscope system having an incident illumination device, in which system various incident illumination modes can be implemented without mechanical displacement; and that no additional elements need to be joined to the stereomicroscope in order to achieve these various incident illumination conditions.

The object is achieved by a stereomicroscope system having an incident illumination device comprising a plurality of LEDs arranged on a focusing arm of a stand of the stereomicroscope system.

The stereomicroscope system according to the present invention having an incident illumination device comprises a base on which a focusing column is secured. Mounted shiftably on the focusing column is a focusing arm which has an opening that serves to receive a stereomicroscope, microscope observation occurring through this opening in the focusing arm. The stereomicroscope can be embodied according to Greenough or can be of the telescope type having a main objective, and can be detachably joined to the focusing arm or integrated thereinto. It defines a device axis that is perpendicular to the base. Multiple light-emitting diodes are arranged in the focusing arm around the microscope receptacle, and further light-emitting diodes are arranged along the focusing arm in the direction toward the focusing column.

The light-emitting diodes are high-power diodes, and the focusing arm serves simultaneously as a heat sink for the high-power diodes. The light-emitting diodes are embodied as high-power white-light diodes.

Each of the light-emitting diodes in the focusing arm defines an illumination axis, the light-emitting diodes being arranged in the focusing arm in such a way that the illumination axes strike the base almost at a focal point of the stereomicroscope. The light-emitting diodes are operable individually or in groups. Their brightness is likewise controllable individually or in groups.

The light-emitting diodes are arranged on the focusing arm to project light along illumination axes at different angles with respect to a specimen plane. The different angles are in a range from 15° to 105°.

At least two light-emitting diodes are arranged on the focusing arm immediately around the receiving opening. These at least two light-emitting diodes are distributed symmetrically about the device axis. The light-emitting diodes arranged around the receiving opening serve for vertical incident illumination.

The multiple light-emitting diodes arranged along the focusing arm in the direction toward the focusing column make available an oblique illumination. Those light-emitting diodes that are secured to the focusing arm in the vicinity of the specimen plane effect a raking illumination that generates strong, relief-like contrast.

The base can also additionally be equipped with a transmitted illumination device. The incident illumination device and the transmitted illumination device can be operated together or independently of one another.

The focusing arm is embodied with multiple recesses into which the light-emitting diodes are inserted.

At least two of the light-emitting diodes on the focusing arm are provided with a cover that represents protection against burning, soiling, and/or damage. The cover can possess filtering properties, so that the light for the light-emitting diodes is filtered differently or similarly.

The filtering properties are embodied in the cover in integrated fashion. The filtering properties can likewise be adhesively bonded onto the cover. The filtering properties can furthermore be mounted as sliders on the cover. In addition, the cover itself can be embodied as a slider, and can be fitted with filters having any desired filtering properties.

The arrangement of the LEDs in the focusing arm makes possible multiple illumination modes with no mechanical displacement of the individual LEDs. The light-emitting diodes are high-power white-light diodes.

These and other objects and advantages of the present invention will be readily appreciable from the following description of preferred embodiments of the invention and from the accompanying drawings and claims.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
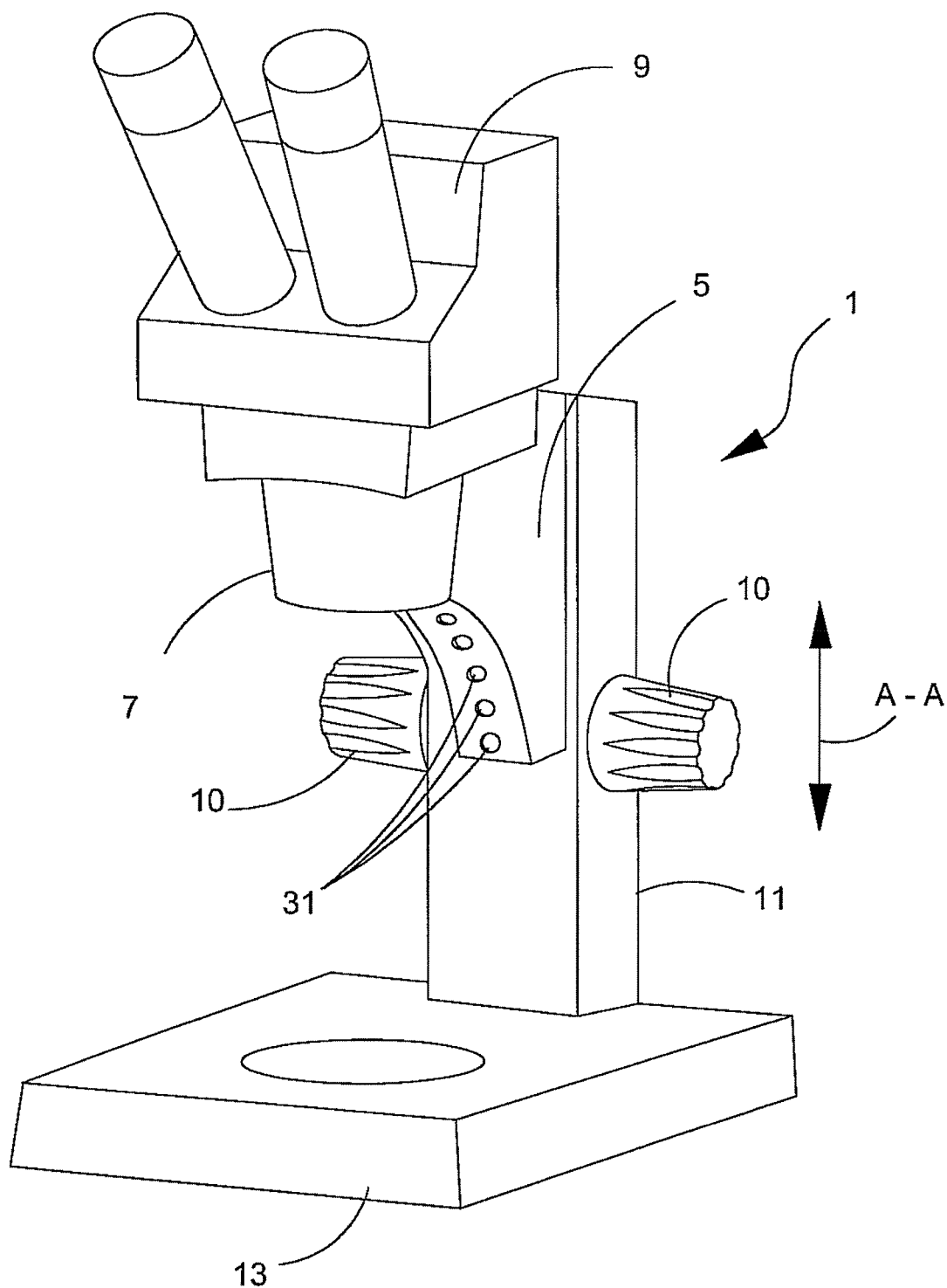
FIG. 1 is a perspective view of a stereomicroscope system according to the invention.

FIG. 1 is a perspective view of a stereomicroscope system 1 according to the present invention. Stereomicroscope system 1 encompasses a base 13 on which a focusing column 11 is secured. Mounted shiftably in focusing column 11 is a focusing arm 5 that can be shifted via displacement elements 10 along double arrow A-A. Focusing arm 5 carries a stereomicroscope 3. Stereomicroscope 3 possesses a binocular tube 9 and an objective group 7 (not further depicted). Stereomicroscope 3 is secured with the objective group on focusing arm 5, on the latter's receiving opening. Multiple light-emitting diodes 31 are provided on focusing arm 5 in the direction toward focusing column 11. Light-emitting diodes 31 serve as an incident illumination system for stereomicroscope system 1.

Figure 2:
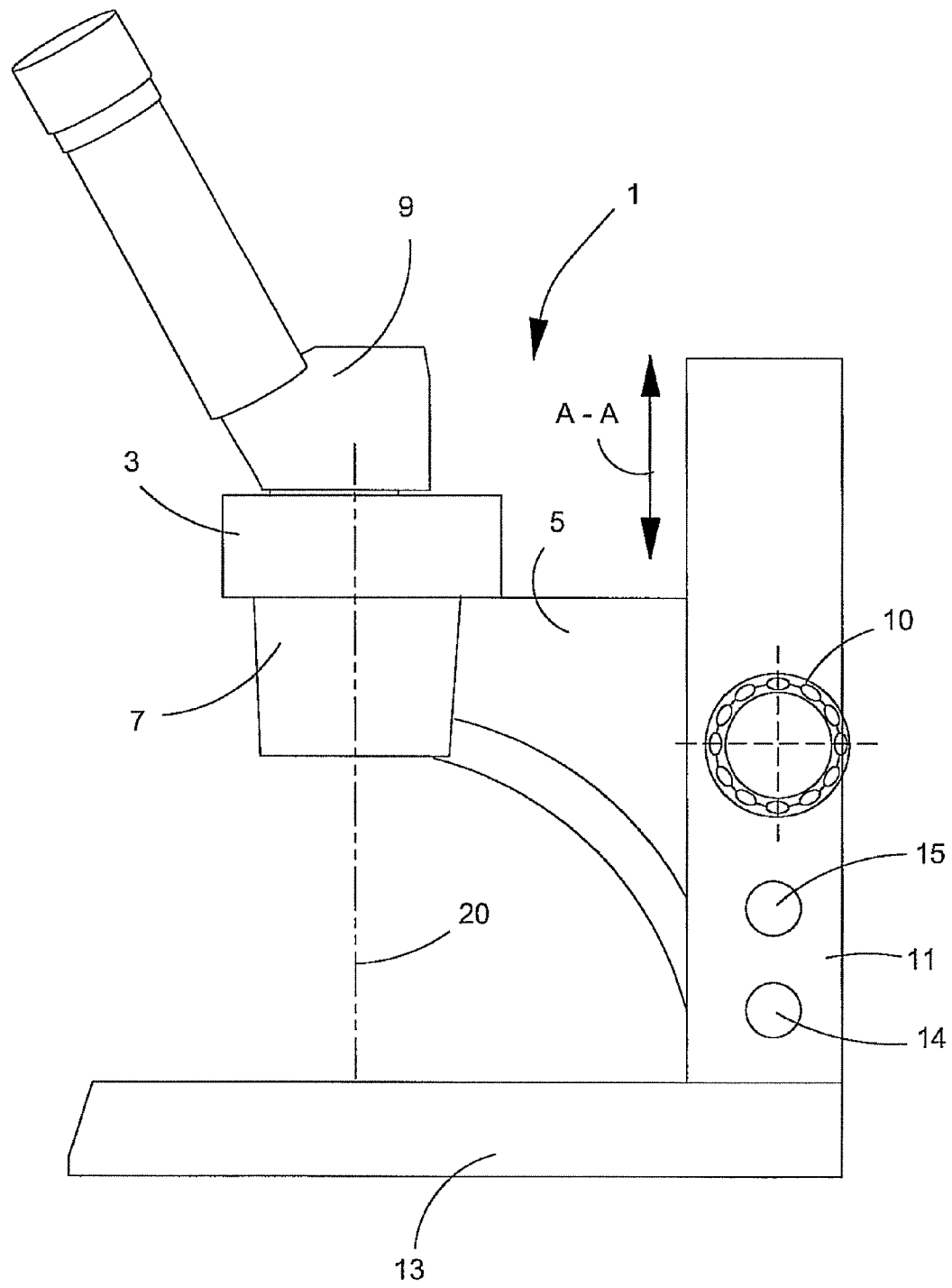
FIG. 2 is a side view of the stereomicroscope system according to the invention.

FIG. 2 is a side view of stereomicroscope 1 according to the present invention. Stereomicroscope 3, mounted in focusing arm 5, can be shifted along double arrow A-A. The shifting is carried out by way of at least one displacement element 10, the displacement element being arranged on the focusing column 11. Stereomicroscope 3 is secured with its objective group on focusing arm 5. Stereomicroscope 3 defines a device axis 20 that is perpendicular to base 13 of stereomicroscope system 1. As already mentioned in the description of FIG. 1, multiple light-emitting diodes 30, 31 are provided on focusing arm 5. The individual light-emitting diodes 30, 31 are operable individually or in groups. The individual light-emitting diodes 30, 31 are likewise controllable in terms of brightness either individually or in groups. An actuation element 14 is provided on focusing column 11 for controlling the brightness of light-emitting diodes 30, 31. A further actuation element 15 is provided on focusing column 11 in order to adjust the illumination mode or the operation of the individual light-emitting diodes in groups. The arrangement of actuation elements 14 and 15 on focusing column 11 is not mandatory; the elements can also, for example, be arranged on the base. With displacement element 10, focusing arm 5 of stereomicroscope 3 can be displaced along double arrow A-A. The displacement of stereomicroscope 3 takes place parallel to device axis 20.

Figure 3:
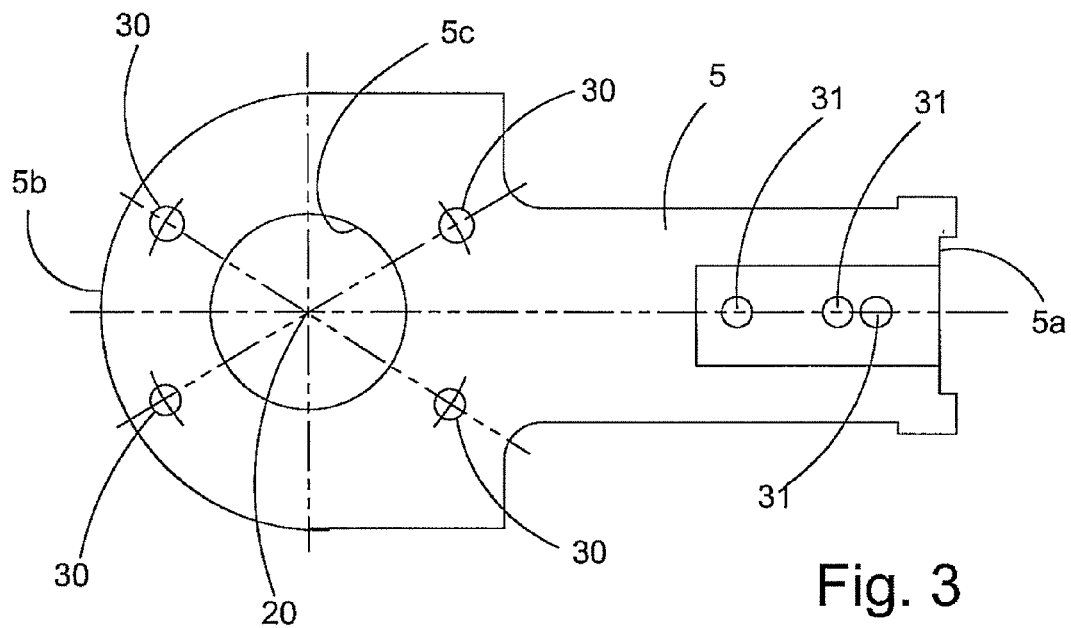
FIG. 3 is a view of the focusing arm from below.

FIG. 3 is a view of focusing arm 5 from below. Focusing arm 5 comprises a rear end 5a that coacts with focusing column 11. Focusing arm 5 likewise comprises a front end 5b that faces toward a user. Front end 5b of focusing arm 5 is embodied with an opening 5c through which microscope observation takes place, and which serves to receive the stereomicroscope. Device axis 20 of stereomicroscope 3 likewise extends centrally through opening 5c of focusing arm 5. A first group of light-emitting diodes 30 is thus arranged on focusing arm 5 around opening 5c. A second group of light-emitting diodes 31 is arranged in the region of rear end 5a of focusing arm 5. In the present embodiment, light-emitting diodes 30 of the first group are arranged symmetrically about opening 5c. This is not to be construed, however, as a limitation of the invention. It is clear to anyone skilled in the art that there are various possibilities for arranging the light-emitting diodes around opening 5c in a manner suitable for achieving optimum incident illumination for a specimen (not depicted) on base 13.

Figure 4:
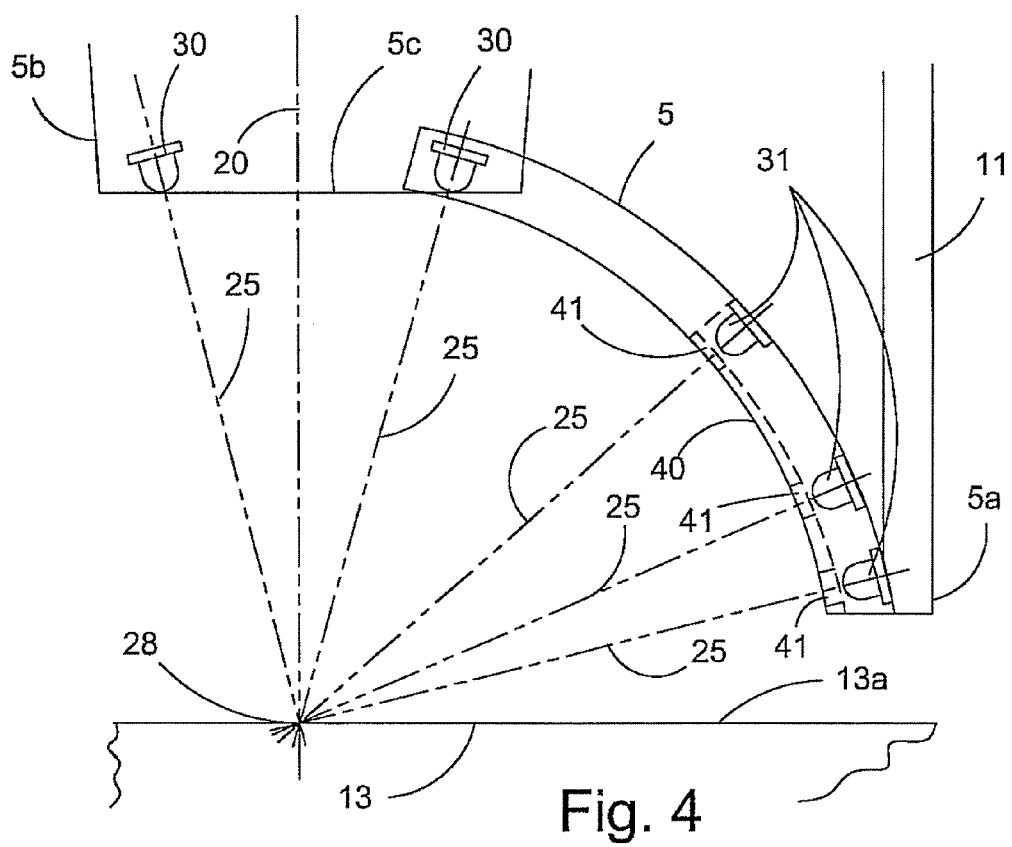
FIG. 4 is a side view of the focusing arm in detail, reproducing the arrangement of the various light-emitting diodes in the focusing arm.

FIG. 4 is a detail view of focusing arm 5. Light-emitting diodes 30 of the first group and light-emitting diodes 31 of the second group are arranged on focusing arm 5 in such a way that their illumination axes 25 strike base 13 approximately at a focal point 28 of stereomicroscope 1. Light-emitting diodes 30 of the first group and light-emitting diodes 31 of the second group are arranged on the focusing arm in such a way that the illumination axes of the individual light-emitting diodes are within an angle range of 15° to 105° with respect to a specimen plane 13a of base 13. At least two of light-emitting diodes 31 of the second group are equipped with a cover 40. Cover 40 serves principally to protect a user from burns. The diodes in the focusing arm can generate considerable heat, so that it may be necessary on the one hand to shield the user from the heat of the high-power light-emitting diodes, and on the other hand to protect the high-power light-emitting diodes themselves from soiling and damage. Focusing arm 5 itself is embodied as a heat sink or cooling element for the first group of light-emitting diodes 30 and the second group of light-emitting diodes 31. Cover 40 for the light-emitting diodes can also additionally be provided with filtering properties, so that the light of the light-emitting diodes can be filtered differently or similarly. The filtering properties can, for example, be integrated into cover 40 as individual color filters 41. It is likewise conceivable for filters 41 to be adhesively bonded onto cover 40. Cover 40 can additionally be embodied as an exchangeable slider. A user can then place corresponding sliders or covers in front of the light-emitting diodes for different spectral illumination conditions. Although not depicted in the drawings, it should also be readily appreciated that a cover 40 can also be arranged and positioned to cover the first group of light-emitting diodes 30.

Figure 5:
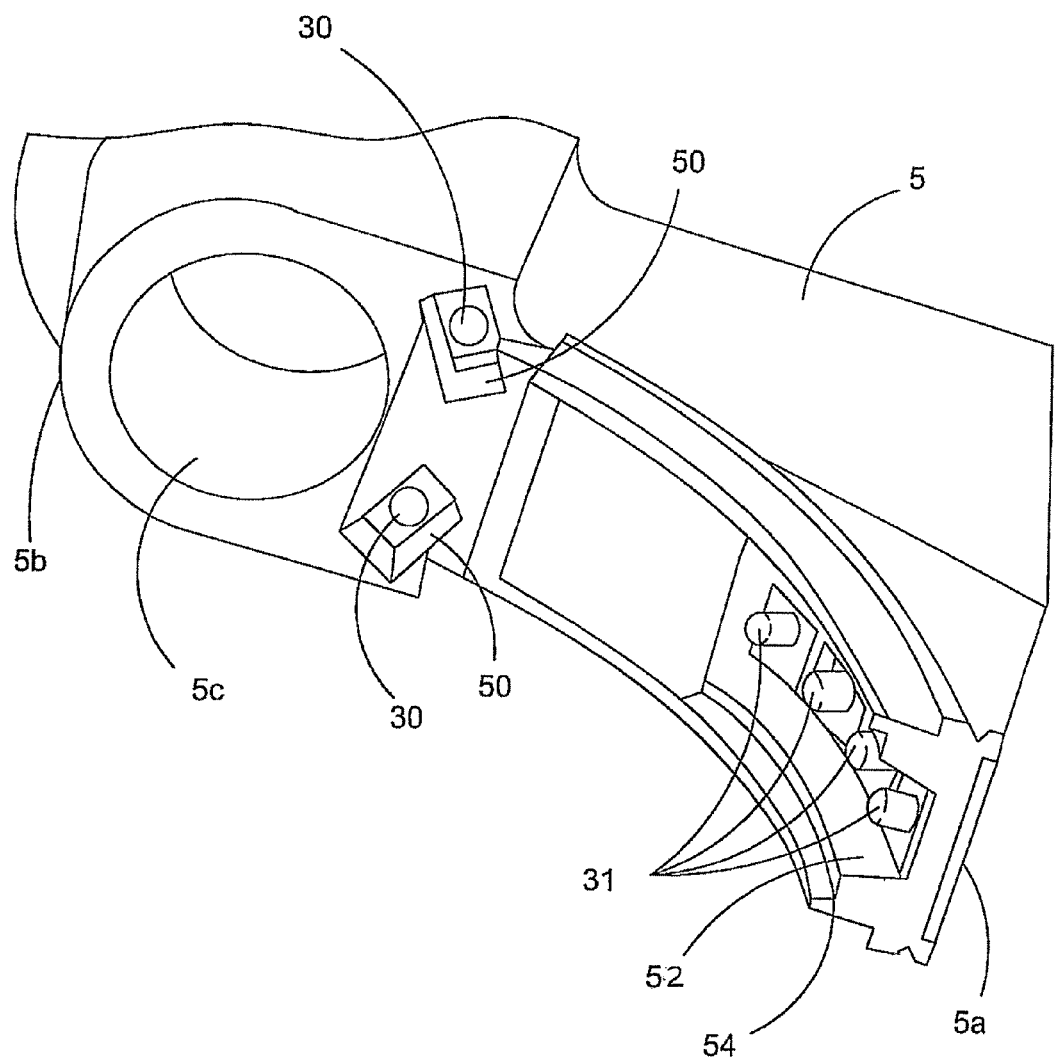
FIG. 5 is a perspective view of the focusing arm from below.

FIG. 5 is a perspective view from below of focusing arm 5 of the present invention, having only two light-emitting diodes 30. Focusing arm 5 is embodied with multiple recesses 50, 52 in which light-emitting diodes 30 of the first group and light-emitting diodes 31 of the second group are located. Recesses 50 for light-emitting diodes 30 of the first group are rectangular recesses in focusing arm 5. Light-emitting diodes 31 of the second group, which are arranged in the direction toward rear end 5a of focusing arm 5, are likewise arranged in a recess 52, the recess being U-shaped to follow the focusing arm. As already mentioned in the description of FIG. 4, the U-shaped recess can be equipped with cover 40 so as thereby to prevent a user from being burned on the high-power light-emitting diodes. U-shaped recess 52 comprises an L-shaped rim 54 in which, for example, cover 40 is retained. If cover 40 is embodied as a slider, L-shaped rim 54 of the U-shaped recess then serves as a guide for the slider.

As is evident from FIG. 4, the first group of light-emitting diodes 30 is provided on focusing arm 5 in such a way that with them, vertical illumination onto specimen plane 13a is possible. For that purpose, light-emitting diodes 30 of the first group are arranged close to opening 5c of the focusing arm. The term "vertical illumination" is meant to include illumination angles from approximately 75° to 105° relative to specimen plane 13a for illumination axis 25 of a light-emitting diode. The second group of light-emitting diodes 31 is arranged on focusing arm 5 for oblique illumination. For that purpose, light-emitting diodes 31 are mounted in the vicinity of rear end 5a of the focusing arm. Light-emitting diodes 31 of the second group, which are mounted closest to specimen plane 13a, provide a raking illumination of the specimen field with its center 28. As already mentioned in the description of FIG. 2, an actuation element 15, with which various illumination modes can be set, is provided on focusing column 11. The various light-emitting diodes 30, 31 can be correspondingly activated so that the different illumination modes can be set. A mechanical displacement of the individual LEDs is not necessary for these different illumination modes. The individual illumination modes can moreover also be combined with one another.

What is claimed is:

1. A stereomicroscope system comprising:
   a base having a specimen plane;
   a focusing column fixed to the base;
   a focusing arm adjustably mounted on the focusing column, the focusing arm including a receiving opening adjacent a front end of the focusing arm and an arcuate underside portion extending in an arc substantially from the receiving opening to a rear end of the focusing arm;
   a stereomicroscope carried by the focusing arm, the stereomicroscope being received in the receiving opening and having a device axis;
   a first group of light-emitting diodes arranged on the focusing arm around the receiving opening to provide vertical illumination of a specimen observed through the stereomicroscope; and
   a second group of light-emitting diodes arranged on the arcuate underside portion of the focusing arm to each emit light along a respective illumination axis extending in a generally radial direction of the arc to provide oblique illumination of a specimen observed through the stereomicroscope, wherein the second group of light emitting diodes includes a light-emitting diode arranged to emit light along an illumination axis intersecting the specimen plane at an angle of 15 degrees relative to the specimen plane.

2. The stereomicroscope system according to claim 1, wherein each of the light-emitting diodes defines a respective illumination axis, and the light-emitting diodes are arranged on the focusing arm such that the illumination axes intersect the base approximately at a focal point of the stereomicroscope.

3. The stereomicroscope system according to claim 1, wherein each of the light-emitting diodes is individually operable and individually controllable with respect to brightness.

4. The stereomicroscope system according to claim 1, wherein at least two of the light-emitting diodes are operable and controllable with respect to brightness as a group.

5. The stereomicroscope system according to claim 1, wherein the first group of light-emitting diodes are distributed symmetrically with respect to the device axis.

6. The stereomicroscope system according to claim 1, wherein the focusing arm includes a plurality of recesses in which the light-emitting diodes are respectively located.

7. The stereomicroscope system according to claim 6, further comprising a cover over at least two of the second group of light-emitting diodes.

8. The stereomicroscope system according to claim 7, wherein the cover includes filtering properties whereby the cover filters light from the covered light-emitting diodes.

9. The stereomicroscope system according to claim 8, wherein the filtering properties are integrally provided in the cover.

10. The stereomicroscope system according to claim 8, wherein the filtering properties are provided by at least one filter adhesively bonded to the cover.

11. The stereomicroscope system according to claim 8, wherein the filtering properties are provided by at least one filter slidably mounted on the cover.

12. The stereomicroscope system according to claim 7, wherein the cover is slidably mounted on the focusing arm and includes one or more filters.

13. The stereomicroscope system according to claim 1, wherein the light-emitting diodes are adjustable to provide multiple illumination modes without mechanical displacement of individual light-emitting diodes.

14. The stereomicroscope system according to claim 13, wherein the light-emitting diodes in the first group are operable as a group and the light-emitting diodes in the second group are operable as a group, whereby vertical illumination, an oblique illumination, and a combination of vertical and oblique illumination are selectable illumination modes without mechanical displacement of individual light-emitting diodes.

* * * * *